United States Patent
Keidar et al.

(10) Patent No.: US 9,749,141 B2
(45) Date of Patent: Aug. 29, 2017

(54) SECURE BOOT DEVICES, SYSTEMS, AND METHODS

(71) Applicant: QUALCOMM Incorporated, San Diego, CA (US)

(72) Inventors: Ron Keidar, San Diego, CA (US); Eugen Pirvu, Mission Viejo, CA (US); Jeff Smith, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 14/866,636

(22) Filed: Sep. 25, 2015

(65) Prior Publication Data

US 2017/0093582 A1    Mar. 30, 2017

(51) Int. Cl.
| | |
|---|---|
| *H04L 29/06* | (2006.01) |
| *H04L 9/32* | (2006.01) |
| *G06F 9/44* | (2006.01) |
| *G06F 21/57* | (2013.01) |
| *G06F 21/64* | (2013.01) |

(52) U.S. Cl.
CPC .......... *H04L 9/3263* (2013.01); *G06F 9/4416* (2013.01); *G06F 21/575* (2013.01); *G06F 21/64* (2013.01); *H04L 2209/64* (2013.01)

(58) Field of Classification Search
CPC ............... H04L 9/3263; H04L 2209/12; H04L 2209/64; G06F 9/4415
See application file for complete search history.

(56) References Cited

U.S. PATENT DOCUMENTS

| | | | |
|---|---|---|---|
| 6,401,208 B2 | 6/2002 | Davis et al. | |
| 7,940,932 B2 | 5/2011 | Paksoy et al. | |
| 8,856,538 B2 | 10/2014 | Costin et al. | |
| 2005/0060549 A1* | 3/2005 | England | G06F 21/10 713/175 |
| 2008/0168275 A1 | 7/2008 | De Atley et al. | |
| 2010/0120527 A1 | 5/2010 | Singh | |
| 2012/0060039 A1 | 3/2012 | Leclercq | |
| 2013/0151848 A1 | 6/2013 | Baumann et al. | |
| 2014/0129818 A1 | 5/2014 | Li et al. | |

FOREIGN PATENT DOCUMENTS

EP    1387237 A2    2/2004

OTHER PUBLICATIONS

International Search Report and Written Opinion—PCT/US2016/044371—ISA/EPO—Oct. 18, 2016—13 pgs.

* cited by examiner

*Primary Examiner* — Dao Ho
(74) *Attorney, Agent, or Firm* — Hunter Clark PLLC

(57) ABSTRACT

A secure boot method includes: obtaining a certificate digest at a digest processor from a write-once, always-on memory; calculating a flash digest using the digest processor by cryptographically processing a sensitive information image; and comparing, using the digest processor, the flash digest with the certificate digest.

26 Claims, 5 Drawing Sheets

SECURE BOOT DEVICES, SYSTEMS, AND METHODS

INTRODUCTION

As society has become more dependent upon electronic information storage and processing, it has become susceptible to attacks on the information and the processing systems. Hackers breech data storage devices and/or corrupt and/or commandeer processing instructions to obtain information that the hackers are not entitled to and/or to have one or more processing systems execute operations that the system(s) were not intended to execute. Hackers may use techniques that range in complexity from the very simple to the very sophisticated and complex in order to access the information and/or to have operations performed. To guard against hackers, techniques have been developed to inhibit the hackers' abilities to access the information and/or to have the operations performed. As protections are developed, however, hackers change tactics to overcome the new protections because there is a strong personal desire and/or a significant financial incentive to do so.

One technique for inhibiting successful hacking a program code for execution is to compute a digest on power up and compare the computed digest against a digest derived from a cryptographically signed certificate before executing the program code. A processor computes the computed digest using the program code and derives the derived digest from the signed certificate and compares the two digests. If the computed digest and the derived digest do not match, the program code is not trusted and therefore not executed. Thus, while the program code may be commandeered by a hacker, the commandeering is not successful because the commandeered program code is not executed. Deriving the digest from a signed certificate, however, uses significant computing resources, consuming processing power, energy, and time.

SUMMARY

An example of a secure boot system includes: a write-once, always-on memory storing a certificate digest; and a digest processor communicatively coupled to the write-once, always-on memory and configured to: calculate a flash digest by cryptographically processing a sensitive information image; and compare the flash digest with the certificate digest.

An example of a secure boot method includes: obtaining a certificate digest at a digest processor from a write-once, always-on memory; calculating a flash digest using the digest processor by cryptographically processing a sensitive information image; and comparing, using the digest processor, the flash digest with the certificate digest.

An example of a secure boot system includes: means for obtaining a certificate digest from a write-once, always-on memory; calculating means for calculating a flash digest in a digest processor by cryptographically processing a sensitive information image; and comparing means for comparing the flash digest with the certificate digest.

An example of a non-transitory processor-readable storage medium includes processor-readable instructions configured to: cause a digest processor to obtain a certificate digest at from a write-once, always-on memory; cause a digest processor to calculate a flash digest by cryptographically processing a sensitive information image; and cause digest processor to compare the flash digest with the certificate digest.

DETAILED DESCRIPTION

Figure 1:
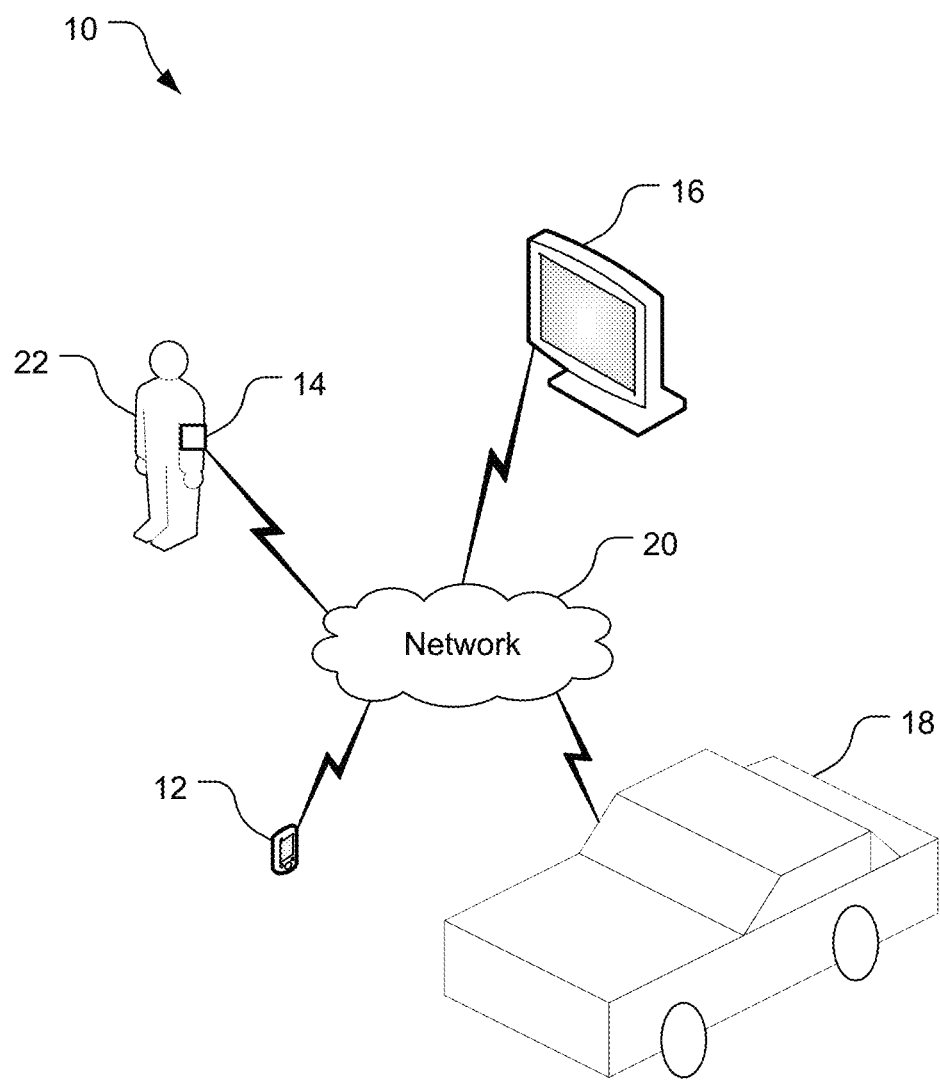
FIG. 1 is a simplified diagram of an assortment of electronic devices configured to communicate with a communications network according to some aspects/embodiments.

Techniques are discussed herein for securely booting processing systems. For example, processing systems may be securely rebooted by re-verifying the authenticity of instructions to be executed without re-verifying the authenticity of a signed certificate containing a certificate digest that is based on the instructions to be executed. For example, a processing system may contain a signed certificate containing a digest that is based on instructions to be executed, a certificate processor, and a digest processor containing write-once, always-on storage.

During system boot, the signed certificate is checked for authenticity by the certificate processor, and in response to the authenticity being verified, the certificate digest is stored in the write-once, always-on storage. Also during the system boot, the digest processor determines a flash digest based on the instructions to be executed stored in an image in the processing system, and possibly based on other information. The digest processor compares the determined flash digest with the certificate digest to determine whether the instructions to be executed are authentic. Preferably, the digest processor determines, through this comparison, whether the determined flash digest is identical to the certificate digest. Preferably, if the flash digest is not identical to the certificate digest, then the instructions are considered not to be authentic. The write-once, always-on storage retains the certificate digest even when the digest processor is powered down. In response to re-powering the digest processor, the digest processor boots up by determining the flash digest and comparing the flash digest with the certificate digest stored in the write-once, always-on storage without the certificate processor re-verifying the authenticity of the signature of the signed certificate. Further, the digest processor can power on/off the certificate processor and take the certificate processor out of reset after power on of the certificate processor. These examples, however, are not exhaustive.

Items and/or techniques described herein may provide one or more of the following capabilities, as well as other capabilities not mentioned. Processing systems may be booted securely and quickly. Processing systems may be booted without re-verifying the authenticity of a signed certificate. Cost and power consumption of devices may be reduced while providing secure boot for the devices. Security level associated with expensive, high-power devices such as phones or tablet computers may be provided in low-cost, low-power devices. Separate processors may be booted asynchronously. A trusted processor may be booted by a non-trusted processor securely. A trusted processor may be re-booted without performing a full secure boot. Boot time may be reduced, to between 10 ms and 1 s, compared to prior techniques. Secure boot may be performed using a reverse order of trust, e.g., by beginning with an untrusted processor to boot a trusted processor. An untrusted processor boots in two stages, a trusted stage and an untrusted stage. Initially the untrusted processor boots in the trusted stage by executing boot instructions from read-only memory (ROM) and then later continues to boot in the untrusted stage by executing boot instructions from software. During the initial, trusted stage, the untrusted processor verifies the authenticity of a certificate and stores a digest from the certificate in write-once, always-on memory. A trusted processor of relatively low cost, relatively low power, and/or relatively small area may be re-booted securely without using a relatively expensive, powerful, larger area processor or asymmetric engine in conjunction with the trusted processor. Other capabilities may be provided and not every implementation according to the disclosure must provide any, let alone all, of the capabilities discussed.

Referring to FIG. 1, a system 10 includes various devices, here a smart phone 12, a blood-pressure monitor 14, a television 16, and an automobile 18, all in communication with a communications network 20. The phone 12, the blood-pressure monitor 14, the television 16, and the automobile 18 are each configured to communicate wirelessly with the network 22 to exchange data with the network 20 which may help provide services. For example, the monitor 14 may provide information to a doctor that may be used to adjust the treatment provided to or directed to a user 22 of the monitor 14. As another example, information regarding the viewing habits of a user of the television 16 may be used to adjust the information provided to the user through the television 16. While the ability to interact with the network 20 may provide multiple advantages for processing systems of the devices, this ability also may make the devices susceptible to attacks, such as hackers altering instructions to be executed by the processing systems. While the devices shown in FIG. 1 are each configured to communicate with the communications network 20, with the devices for example being examples of Internet of Things (IoT) devices, devices other than IoT devices may be used, including devices that are not configured to communicate with a communications network, wirelessly or through wired connections. Further, the devices shown in FIG. 1 are examples only and numerous other types of devices may be used including, but not limited to other IoT devices such as proximity sensors, camera sensors, remote locks, garage door openers, irrigation systems, weather sensors, biometric sensors, wearable sensors, etc.

Figure 2:
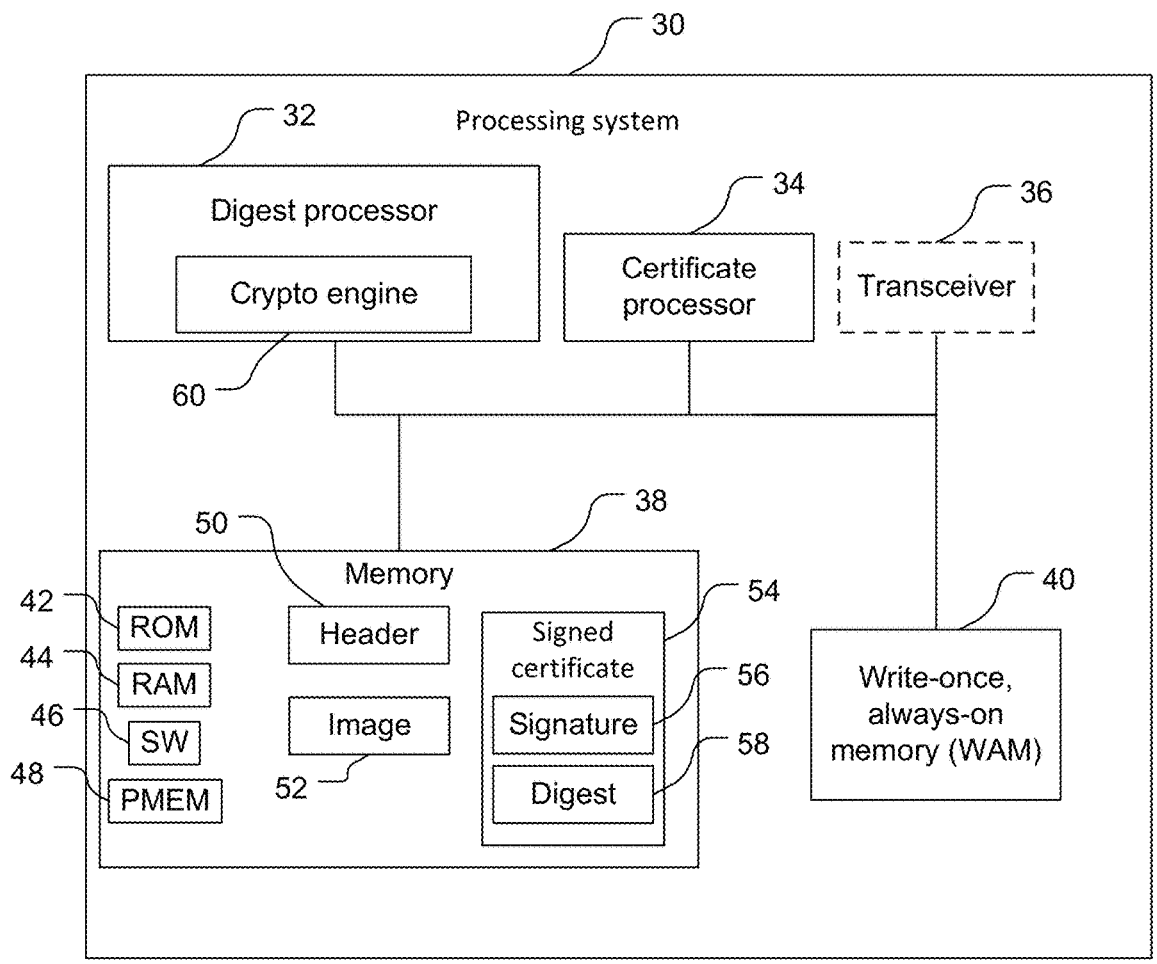
FIG. 2 is a block diagram of a processing system that may be contained in any of the devices shown in FIG. 1 according to some aspects/embodiments.

Referring to FIG. 2, an example of one of the devices shown in FIG. 1 comprises a processing system 30 that comprises a digest processor 32, a certificate processor 34, a transceiver 36, a memory 38, and a write-once, always-on memory (WAM) 40. The processors 32, 34, the transceiver 36, the memory 38, and the WAM 40 are communicatively coupled to each other for bi-directional communication, that is, these components are configured and coupled to communicate with each other directly and/or indirectly. The digest processor 32 is configured to perform operations other than determining a flash digest (and other operations discussed herein), but is referred to herein as the digest processor for convenience. For example, the digest processor 32 includes a crypto engine 60 that is a hardware engine separate from a central processing unit (CPU) of the digest processor 32. Similarly to the digest processor 32, the certificate processor 34 is configured to perform operations other than determining a certificate digest (and other operations discussed herein), but is referred to herein as the certificate processor for convenience. The processing system 30, as discussed in further detail below, is configured to securely boot, including having the digest processor 32 securely re-boot without having the certificate processor 34 re-verify that the signature 56 of the signed certificate 54 is authentic.

The transceiver 36 may be configured to communicate wirelessly and/or through a wired connection with external devices. Further, the transceiver 36 is optional and may not be present in a particular device. The transceiver 36 is configured to communicate bi-directionally, directly or indirectly, with the network 14 and/or other communications devices such as base transceiver stations, mobile devices such as phones, etc. The transceiver 36 can establish a telecommunication link to the network 18 to send information from the processors 32, 34 to entities outside of the device containing the processing system 30, and to receive information from entities outside of the device containing the processing system 30 and pass this information to the processors 32, 34.

The digest processor 32 and the certificate processor 34 each preferably include an intelligent hardware device, e.g., a central processing unit (CPU) such as those made or designed by QUALCOMM®, ARM®, Intel® Corporation, or AMD®, a microcontroller, an application specific integrated circuit (ASIC), etc. Either or both of processors 32, 34 could comprise multiple separate physical entities that can be distributed in the processing system 30. The processors 32, 34 are discussed further below. The digest processor 32 is configured to calculate a digest and compare the digest with a verified and stored digest in response to being booted. The digest processor 32 is configured to re-calculate the digest and compare the digest with the stored digest. The certificate processor 34 is configured to boot by locking and storing an image (discussed below) and to verify a digest from a signed certificate by executing instructions stored in read-only memory, i.e., while in a trusted mode. The certificate processor 34 is further configured to, while the certificate processor 34 is in the trusted mode, store the verified digest in the WAM 40. The certificate processor 34 is configured to operate in an untrusted mode, executing instructions in random-access memory, after executing the instructions in the read-only memory. As discussed further below, the certificate processor 34 is configured to perform compute-intensive operations once at power-on boot in a secure environment based on a certificate and data to be authenticated, and the digest processor 32 is configured to perform less compute-intensive operations to re-authenticate the data when reloaded after a power collapse.

The memory 38 includes read-only memory (ROM) 42, random-access memory (RAM), software (SW) 46, persistent memory 48, a header 50, an image 52, and a signed certificate 54 that includes a signature 56 and a digest 58. The image 52 may be a software image and may be stored in the persistent memory 48 that may be, e.g., flash memory, a secure digital (SD) card, hard disk, etc. The memory 38 is a processor-readable storage medium that stores the software 46 which is processor-readable, processor-executable software code containing instructions that are configured to, when executed, cause either or both of the processors 32, 34 to perform various functions described herein (although the description may refer only to the processor 32 and/or the processor 34 performing a function), including to cause one or more other entities to perform a function (e.g. for the WAM 40 to store information). Alternatively, the software 46 may not be directly executable by the processor 32 or the processor 34 and instead may be configured to cause the processor 32 or the processor 34, e.g., when compiled and executed, to perform the appropriate function(s). The memory 38 and the processors 32, 34 are communicatively coupled, that is, the processors 32, 34 and the memory 38 are configured to communicate with each other directly and/or indirectly. The header 50 and the image 52 are stored in a file format for executables. For example, the header 50 and the image 52 may be stored in accordance with the Executable and Linkable Format (ELF).

The header 50 and the image 52 are sensitive information that may be part of a file produced by a developer and stored in the persistent memory 48. For example, the developer creates a file that includes the header 50 and the image 52 and provides the file to the processing system 30 and to a code-signing application of a manufacturer of the processing system 30. The header 50 includes indications of parameters for the image 52, e.g., bit length of addresses (e.g., 32-bit addresses or 64-bit addresses), target operating system application binary interface (ABI), etc. The header 50 may include indications of sizes of parts of the code making up the image 52, start addresses of the parts of the code, an index of these parts, hashes of the code parts, and/or a certificate that contains a hash of all the hashes combined. The image 52 is a sensitive information image that includes sensitive information, i.e., information that it is desirable to confirm has not been altered before using or acting upon the information, such as instructions of a program to be executed by the digest processor 32. These instructions are particularly sensitive information because these instructions are susceptible to attacks (exploits) in order to have the digest processor 32 execute instructions that the digest processor 32 was not originally intended to perform, and/or to perform intended instructions in an order that was not originally intended.

The signed certificate 54 includes the signature 56 and the digest 58 and may be stored in the persistent memory 48. The signature 56 is provided by a certificate authority that has been presented with the digest 58, with the certificate authority combining the signature 56 with the digest 58 to produce the signed certificate 54 that the certificate authority provides to the processing system 30. The signature 56 can be used to verify that the signed certificate 54 is valid and thus that the digest 58 is authentic.

The WAM 40 is configured to store information and to retain that information even if the digest processor 32 is powered down. The WAM 40 is configured to clear its memory (e.g., a register) when the WAM 40 is powered down in conjunction with the certificate processor 34 being powered down as well, and to write to its memory only once after being powered up. That is, after being powered up and writing to its memory, the WAM 40 is incapable of writing to its memory again while still powered up. The WAM 40 in configured to write to its memory again only after being powered back down, along with the certificate processor 34 being powered down, and powered back up again. The WAM 40 is configured to retain the information written to its memory even while the certificate processor 34 is powered down. The WAM 40 is preferably configured to be powered down only when the processing system 30 is powered down. Thus, the WAM 40 is "always on" in the sense that the WAM 40 is configured to remain powered on while the digest processor 32, and possibly the certificate processor 34, is powered down. The WAM 40 may, however, be powered down, e.g., along with the certificate processor 34, along with the processing system 30, and/or independently of the processing system 30 or any component thereof. The WAM 40 is on an always-on power domain such that shutting off of the digest processor 32 (and/or the certificate processor 34) will not affect the information storage of the WAM 40. Thus, the WAM 40 has persistent memory that persists in storing information during power cycles of the digest processor 32 and/or the certificate processor 34.

The digest processor 32 is a relatively low-power, slow processor relative to the certificate processor 34. The digest processor 32, for example, may have no cache, have a slower clock speed relative to the certificate processor 34, have less access to memory (e.g., RAM, disk) than the certificate processor, and/or may have less access to resources (e.g., and RSA (Rivest Shamir Adleman) accelerator). The digest processor 32 may be configured to perform limited tasks using few processing resources while the certificate processor 34 is configured to run applications. The digest processor 32 is configured to trigger the crypto engine 60, e.g., to calculate a flash digest, as discussed below. The digest processor 32 is configured to access the image 52 while the image 52 is inaccessible to processors other than the digest processor 32 and the certificate processor 34, e.g., while locked in the RAM 44 or stored in internal memory (both discussed below). The digest processor 32 is configured to perform digest comparison/verification while the certificate processor 34 is configured to perform RSA/certificate of valuation in accordance with instructions in the software 46 to extract a certificate digest from the signed certificate 54. For example, the digest processor 32 may be configured to compare a flash digest with a certificate digest. The digest processor 32 may determine the authenticity of an image based on this comparison, and complete boot by authorizing execution of instructions in the image if the comparison indicates that the image has not been altered from its original content.

The digest processor 32 is a trusted, secure processor while the certificate processor 34 is initially trusted and then later on not trusted. The certificate processor 34 is configured to perform, initially, operations in accordance with instructions in the ROM 42, and then to perform operations in accordance with instructions in the RAM 44. The certificate processor 34 is trusted while performing operations in accordance with the ROM 42 and untrusted (i.e., less trusted than while performing operations in accordance with the ROM 42) when performing operations in accordance with the instructions in the RAM 44. The digest processor 32 may, for example, be part of a trusted execution environment (TEE) of the processing system 30. The certificate processor 34 may be configured to, while trusted, load the image 52, for example from the persistent memory 48 to the RAM 44 that is shared by the processors 32, 34. The certificate processor 34 may be configured to lock the image 52 when in the RAM 44 and/or to copy the image 52 to internal memory that processors other than the digest processor 32 and the certificate processor 34 cannot access.

The crypto engine 60 is a hardware engine configured to perform cryptographic operations on information input to the crypto engine 60. For example, the crypto engine 60 may be configured to calculate a flash digest by cryptographically processing a sensitive information image, e.g., the image 52.

For example, the crypto engine 60 may be configured to perform a secure hash algorithm (SHA) (e.g., SHA-1, SHA256, etc.) on plain text to produce the flash digest. The crypto engine 60 is configured to be triggered by the digest processor 32. The crypto engine 60 is a hardware engine and uses less power than the certificate processor 34 uses to perform the RSA calculations. The crypto engine 60 is preferably configured to perform cryptographic operations on the entire image 52 to help ensure that the image 52 has not been compromised, e.g., altered.

The digest processor 32, the certificate processor 34, the memory 38, and/or the WAM 40, alone or in any appropriate combination (e.g., the processor(s) 32, 34 executing instructions stored in the memory 38) comprise means for performing functions/operations discussed herein. For example, these entities, alone or in combination, provide: means for obtaining a certificate digest; calculating means for calculating a flash digest by cryptographically processing a sensitive information image; comparing means for comparing the flash digest with a certificate digest; means for verifying, using a certificate processor, a signature of a cryptographically-signed certificate that includes the certificate digest; means for storing the certificate digest in the write-once, always-on memory in response to verifying the signature of the cryptographically-signed certificate. For example, the calculating means may comprise the crypto engine 60.

Figure 3:
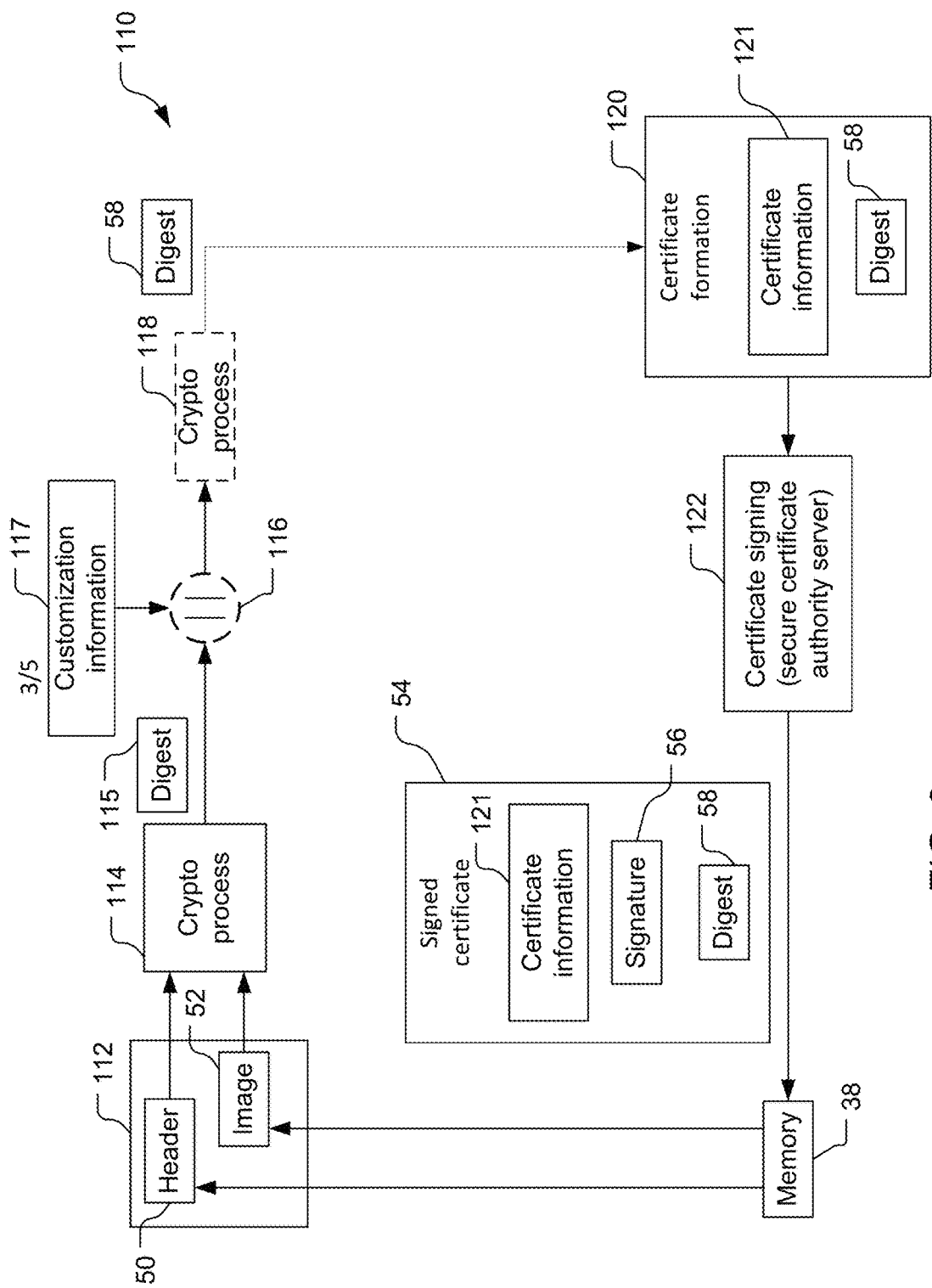
FIG. 3 is a block flow diagram of a process of producing and storing a signed certificate in the processing system shown in FIG. 2 according to some aspects/embodiments.

Referring to FIG. 3, with further reference to FIG. 2, a process 110 of provisioning and storing the signed certificate 54 includes the stages shown. The process 110 is, however, an example only and not limiting. The process 110 may be altered, e.g., by having stages added, removed, rearranged, combined, performed concurrently, and/or having single stages split into multiple stages. For example, stages 116, 118 may be removed from the process 110 such that the digest 115 output from stage 114 is the digest 58. Other modifications to the process 110 are possible.

At stage 112, the header 50 and the image 52 are created and provided to the crypto engine 60 and to the memory 38. For example, a software developer creates a file that includes the header 50 and the image 52 and provides the file to a manufacturer of the processing system 30 (e.g., to a manufacturer of a device containing the processing system 30). The manufacturer stores the header 50 and the image 52 in the memory 38 of the processing system 30 and also provides the header 50 and the image 52 to a code signing application of the manufacturer that includes a cryptographic processing stage 114 and optionally stages 116 and 118.

At stage 114, a crytpographic process is performed on the header 50 and the image 52. The cryptographic process may be a secure hash algorithm (SHA) (e.g., SHA-1, SHA256, etc.) that uses the header 50 and the image 52 as inputs and produces a digest 115 by hashing the header 50 and the image 52 with other information. The cryptographic process may be performed by a processor of the manufacturer, and not necessarily by the crypto engine 60.

At stage 116, the process 110 includes concatenating the digest 115 and customization information 117. For example, the customization information 117 may include a manufacturer ID and/or a product ID and/or an image version and/or other information. The customization information 117 thus helps to modify the digest 115 to be more unique, if not actually unique.

At stage 118, another cryptographic process is performed, this time using the concatenation of the digest 115 and the customization information 117 as an input. The cryptographic process at stage 118 may be the same cryptographic process as at stage 114. Thus, for example, the concatenation of the digest 115 and the customization information 117 may be hashed in a secure hash algorithm with other information (e.g., a random number) to produce the digest 58. As mentioned above, if the stages 116 and 118 are omitted, then the digest 115 will be the digest 58.

At stage 120, certificate formation is performed. The digest 58 is combined with certificate information 121 to form a certificate. The certificate information 121 may include various information such as a manufacturer identity, and anti-rollback version, a debug vector, a debug SoC (system on a chip) serial number, a root of trust (RoT) index, etc. The certificate formation may be performed by the manufacturer of the processing system 30 (e.g., the manufacturer of a device containing the processing system 30). The certificate is then sent to a certificate authority for signing.

At stage 122, the process 110 includes a certificate signing. The certificate authority receives the certificate from the manufacturer that was formed at stage 120 and forms and adds the signature 56 to the certificate 120. The certificate authority is a secure server that verifies the origin of the certificate 120 and provides the signature 56, using a highly-secured private cryptographic key, as an indication of this verification. The certificate authority outputs from the stage 122 the signed certificate 54 including the certificate information 121, the signature 56, and the digest 58. The signed certificate 54 is provided to the memory 38, which stores the signed certificate 54.

Figure 4:
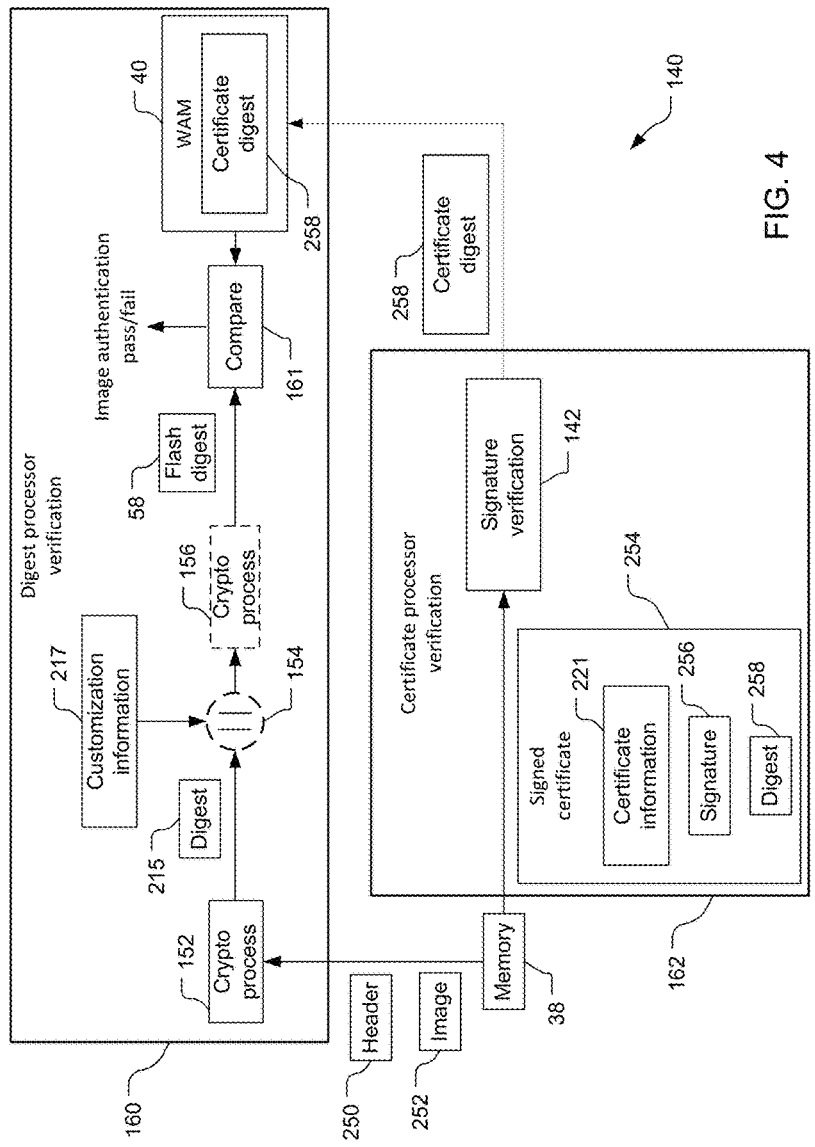
FIG. 4 is a mixed block-flow and simplified-hardware-block diagram of a process of using the signed certificate to determine whether sensitive information stored in the processing system shown in FIG. 2 has been altered according to some aspects/embodiments.

Referring to FIG. 4, with further reference to FIGS. 2-3, a split secure boot process 140 includes the stages shown. The process 140 includes a digest processor verification stage 160 and a certificate processor verification stage 162. The certificate processor 34 preferably performs the stage 162 by executing instructions stored in the ROM 42. The process 140 is, however, an example only and not limiting. The process 140 may be altered, e.g., by having stages added, removed, rearranged, combined, performed concurrently, and/or having single stages split into multiple stages. For example, while signature verification is shown as being performed by the certificate processor 34 and cryptographic processing and comparison are performed by the digest processor 32, a single processor (even if comprising multiple entities) could perform all the operations shown. In this case, the boot process would not be a split boot process in that the boot process would not be split between separate processors. As another example, stages 154, 156 may be omitted from the process 140 such that the digest 158 output from stage 156 is the digest 215. Stages 154, 156 are omitted from the process 140 if stages 116, 118 are omitted from the process 110. Other modifications to the process 110 are possible. Stage 152, and stages 154, 156 if used, may be performed asynchronously relative to stage 142, and thus may be performed in parallel with stage 142, consecutively with stage 142, or partially in parallel and partially consecutive with stage 142. Also, while stages 152, 156 are shown in a digest processor verification, the stages 152, 156 are performed by the crypto engine 60 as triggered by the digest processor 32, but not performed by the digest processor 32 itself. The process 140 may determine whether sensitive information stored in the processing system shown in FIG. 2 has been altered.

At stage 142, the process 140 includes a certificate signature verification. The certificate processor 34 receives a signed certificate 254 from the memory 38, verifies the signature 256 (or fails to verify the signature 256), and stores the digest 258 in response to verifying the signature 256. The signed certificate 254 includes certificate information 221, a signature 256, and a certificate digest 258. The certificate processor 34 is configured to verify a signature of a cryptographically-signed certificate, here the signed certificate 254, that includes the certificate digest 258. The certificate processor 34 is configured to verify the signature 256 by executing instructions stored in the ROM 42, i.e., to perform signature verification of the signature 256. For example, the certificate processor 34 performs RSA and public key operations to verify the signature 256 using public keys associated with the certificate authority private key that was used to generate the signature 54, and thus the signed certificate 54. The certificate processor 34 is further configured to store the certificate digest 258 in the write-once, always-on memory 40 in response to verifying the signature 256 of the cryptographically-signed certificate 254. If the signature is verified at stage 142, then the certificate digest 258 is trusted to be the digest 58 that was originally produced and stored in the memory 38, i.e., that the digest 58 has not been altered. With the certificate digest 258 trusted to be the digest 58, the certificate processor 34 provides the certificate digest 258 to the WAM 40, and the WAM 40 stores the certificate digest 258. The certificate processor 34 is configured to execute instructions stored in random-access memory after executing the instructions stored in read-only memory.

A header 250 and an image 252 are provided to the crypto engine 60 from the memory 38 for cryptographic processing. The header 250 may or may not match the header 50 created by the developer and stored in the memory 38 during the process 110. That is, the processing system 30 may have been hacked and the header 50 may have been altered. Also or alternatively, the image 252 may or may not match the image 52 created by the developer and stored in the memory 38 during the process 110. That is, the processing system 30 may have been hacked and the image 52 may have been altered.

At stage 152, the header 250 and the image 252 are provided to the crypto engine 60 and cryptographically processed. For example, the crypto engine 60 performs a cryptographic process on the header 250 and the image 252 to produce a digest 215. The cryptographic process may be a secure hash algorithm (SHA) (e.g., SHA-1, SHA256, etc.) that uses the header 250 and the image 252 as inputs and produces the digest 215 by hashing the header 250 and the image 252 with other hashing information (e.g., a random number). If the header 250 and the image 252 are the same as when the header 50 and the image 52 were originally produced and stored, the same cryptographic process is used as in stage 114 of the process 110, and the same other hashing information is used for the cryptographic process in stage 152 as was used in stage 114, then the digest 215 will be the same as the digest 115.

At stage 154, the process 140 includes concatenating the digest 215 and customization information 217. The customization information 217 is the same as the customization information 117 and thus may include a manufacturer ID and/or a product ID and/or an image version and/or other information. The concatenation at stage 154 is the same concatenation as at stage 116 of the process 110.

At stage 156, another cryptographic process is performed, this time using the concatenation of the digest 215 and the customization information 217 as an input. The cryptographic process at stage 156 may be the same cryptographic process as at stage 152. Thus, for example, the concatenation of the digest 215 and the customization information 217 may be hashed in a secure hash algorithm by the crypto engine 60 with other information (e.g., a random number) to produce a flash digest 158. As mentioned above, if the stages 154, 156 are omitted, then the digest 215 will be the digest 158. If the header 250 and the image 252 are the same as when the header 50 and the image 52 were originally produced and stored, and the same other hashing information is used for the cryptographic process in stage 152 as was used in stage 114, because the customization information 217 and the customization information 215 are the same, the same concatenation and cryptographic process are performed at stages 116, 154 and stage 118, 156, respectively, then the flash digest 158 will be the same as the digest 58.

At stage 161, a comparison is made of the flash digest 158 and the certificate digest 258. The digest processor 32 compares the flash digest determined/computed in stages 152, 154, 156 with the certificate digest 258 verified in stage 142 and stored in the WAM 40. That is, the process 140 includes comparing the flash digest 158 with the certificate digest 258 for image authentication. If the flash digest 158 matches the certificate digest 258, then the header 50 and the image 52 are the same as the header 250 and the image 252, respectively. This means that the image 52 has not been altered, and thus that the image 252 is authenticated, and may be trusted and used by the digest processor 32 to perform operations in accordance with instructions in the image 252.

The digest processor verification 160 can be repeated without repeating the certificate processor verification stage 162. The digest processor 32 may be powered down independently of the WAM 40 being powered down, that is, the digest processor 32 may be powered down without the WAM 40 being powered down, and thus without the memory of the WAM 40 being cleared. Thus, the digest processor 32 may be powered down and information stored by the WAM 40 will be persistent, that is, continue to be stored by the WAM 40 and be retrievable/readable from the WAM 40. Thus, the digest processor 32 may be powered down and then powered up again. If the WAM 40 has been written to and has not been powered down, then the digest processor verification 160 may be repeated, with the digest processor 32 re-reading the certificate digest 258 from the WAM 40, and without the certificate processor verification 162 (and thus the signature verification, e.g., including RSA processing) being repeated. The certificate processor 34 may also be powered down independently of the WAM 40 being powered down, or the WAM 40 may be powered down whenever the certificate processor 34 is powered down. The digest processor 32 may be repeatedly power cycled, being powered down and powered back up again. In response to the digest processor 32 being powered on, the digest processor verification 160 may be repeated without the certification digest processor verification 162 being performed. That is, the digest processor 32 is configured to respond to powering up by calculating the flash digest 158 and comparing the flash digest 158 with the certificate digest 258, and thus examples of secure boot include responding to the digest processor 32 being re-powered on by repeating the digest processor verification 160, i.e., calculating the flash digest 158 and comparing the flash digest 158 with the certificate digest 258.

Figure 5:
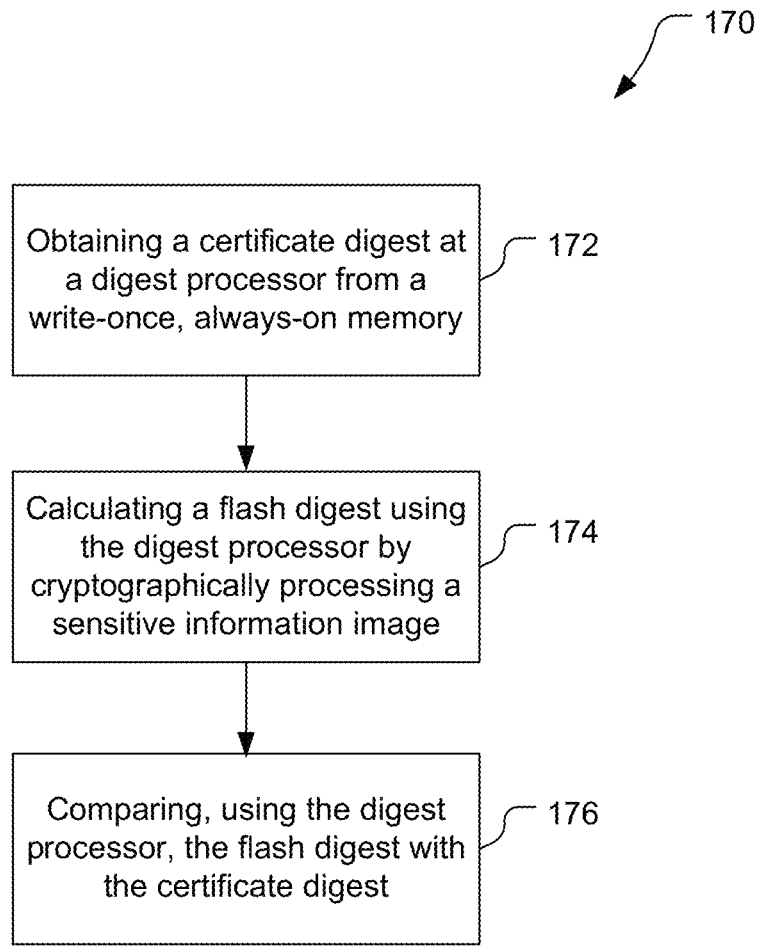
FIG. 5 is a block flow diagram of a process for secure boot of at least part of the processing system shown in FIG. 2 according to some aspects/embodiments.

Referring to FIG. 5, with further reference to FIGS. 1-4, a process 170 for secure boot of at least part of the processing system 30 shown in FIG. 2 includes the stages shown. The process 170 is, however, an example only and not limiting. The process 170 may be altered, e.g., by having stages added, removed, rearranged, combined, performed concurrently, and/or having single stages split into multiple stages. The process 170 may, for example, be carried out by the digest processor verification 160.

At stage 172, the process 170 includes obtaining a certificate digest at a digest processor from a write-once, always-on memory. For example, the digest processor 32 may read the certificate digest 258 from the WAM 40. This may be the first time that the digest processor 32 has read the certificate digest 258 from the WAM 40 since the certificate digest 258 was written to the WAM 40, or the digest processor 32 may have read the certificate digest 258 from the WAM 40 one or more times previously since the certificate digest 258 was written to the WAM 40.

At stage 174, the process 170 includes calculating a flash digest using the digest processor by cryptographically processing a sensitive information image. For example, the digest processor 32 receives the header 250 and the image 252 from the memory 38, triggers the crypto engine 60 to process the header 250 and the image 252 to produce the digest 215. The digest processor 32 can optionally concatenate the digest 215 with the customization information 217 and trigger the crypto engine 60 to cryptographically process the concatenated information to produce the flash digest 158.

At stage 176, the process 170 includes comparing, using the digest processor, the flash digest with the certificate digest. For example, the digest processor 32 compares the flash digest 158 with the certificate digest 258 and authenticates the image 252 (and the header 250) if the flash digest 158 matches the certificate digest 258 to complete the boot of the digest processor 32 and approve of use of the image 252 for further processing. The digest processor 32 will terminate the boot of the digest processor 32 if the authentication of the image 252 fails, that is, if the flash digest 158 does not match the certificate digest 258.

The process 170 may include one or more of the following features. The process 170 may further include verifying, using the certificate processor 34, the signature 256 of the cryptographically-signed certificate 254 that includes the certificate digest 258, and storing the certificate digest 258 in the write-once, always-on memory 40 in response to verifying the signature 256 of the cryptographically-signed certificate 254. Verifying the signature 256 may comprise the certificate processor 34 executing instructions stored in the read-only memory 42. Examples of the process 170 may include the certificate processor executing instructions stored in random-access memory only after executing the instructions stored in read-only memory 42. For example, the certificate processor 34 performs the certificate processor verification by executing instructions stored in the ROM 42, e.g., to verify the signature 256 and send the certificate digest 258 to the WAM 40 for storage. The digest processor 32 may be a lower-power-consuming processor than the certificate processor 34. The digest processor 32 may perform the calculating and the comparing in response to the digest processor 32 powering up. The digest processor 32 is configured to calculate, and here calculates, the flash digest 158 using information associated with a manufacturer of the processing system 30, or a product identification, or both the information associated with the manufacturer of the product and the product identification. For example, the crypto engine 60 may perform a hash function on the information associated with the manufacturer and/or the product information, preferably in addition to the program information such as the image 52. Also or alternatively, the image 52 is preferably copied and locked (preventing modifications) before the flash digest is calculated at stage 174.

Other Considerations

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include that the information is conveyed from a sending entity but does not reach an intended recipient of the information. The intended recipient, even though not actually receiving the information, may still be referred to as a receiving entity, e.g., a receiving execution environment.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

We claim:

1. A secure boot system comprising:
   a write-once, always-on memory for storing a certificate digest comprising a digest of a sensitive information image resulting from cryptographically processing the sensitive information image, wherein the write-once, always-on memory is configured to be writable one time once powered up;
   a certificate processor communicatively coupled to the write-once, always-on memory and configured to authenticate a certificate, to extract the certificate digest from the certificate, and to store the certificate digest in the write-once, always-on memory responsive to the secure boot system being powered up to ensure that the certificate digest cannot be modified once extracted by the certificate processor, wherein the write-once, always-on memory is configured to retain contents of the memory until the certificate processor is powered down, and to clear the contents of the memory responsive to the certificate processor being powered down; and
   a digest processor communicatively coupled to the write-once, always-on memory and configured to perform a boot process responsive to the secure boot system being powered up or the digest processor being rebooted, the digest processor being independently bootable from the certificate processor, the digest processor being configured to:
      calculate a flash digest by cryptographically processing the sensitive information image;
      compare the flash digest with the certificate digest; and
      terminate the boot process of the digest processor responsive to the flash digest not matching the certificate digest,
   wherein the certificate processor is configured to perform more computationally-intensive operations than the digest processor, and wherein the certificate processor is configured to authenticate the certificate and extract the certificate digest only at power-up to conserve power.

2. The system of claim 1, wherein the certificate is a cryptographically-signed certificate stored in a memory separate from the write-once, always-on memory, and wherein the certificate processor is further configured to:
   verify a signature of the cryptographically-signed certificate;
   extract the certificate digest from the certificate; and
   store the certificate digest in the write-once, always-on memory in response to verifying the signature of the cryptographically-signed certificate prior to the digest processor comparing the certificate digest to the flash digest.

3. The system of claim 2 wherein the certificate processor is configured to verify the signature by executing instructions stored in read-only memory.

4. The system of claim 2 wherein the certificate processor is configured to lock the sensitive information image to inhibit modification of the sensitive information image.

5. The system of claim 2 wherein the digest processor is a lower-power-consuming processor than the certificate processor.

6. The system of claim 1 wherein the system is configured to have the write-once, always-on memory remain powered on while the digest processor is powered down, and wherein the digest processor is configured to respond to powering up by calculating the flash digest and comparing the flash digest with the certificate digest.

7. The system of claim 1 wherein the digest processor is configured to calculate the flash digest using information associated with a manufacturer of the system, or a product identification, or both the information associated with the manufacturer of the system and the product identification.

8. The secure boot system of claim 1, wherein the digest processor is further configured to complete the boot process of the digest processor responsive to the flash digest matching the certificate digest.

9. A secure boot method comprising:
   generating a certificate digest at a certificate processor of a secure boot system responsive to the secure boot system being powered up by authenticating a certificate and extracting the certificate digest from the certificate, the certificate digest comprising a digest of a sensitive information image resulting from cryptographically processing the sensitive information image;

storing the certificate digest in a write-once, always-on memory, wherein the write-once, always-on memory is configured to be writable one time once powered up, to retain contents of the memory until the certificate processor is powered down, and to clear the contents of the memory responsive to the certificate digest being powered down, wherein the certificate digest is stored in the write-once, always-on memory to ensure that the certificate digest cannot be modified once generated by the certificate processor;

obtaining the certificate digest at a digest processor from the write-once, always-on memory responsive to the secure boot system being powered up or the digest processor being rebooted, the digest processor being independently bootable from the certificate processor;

calculating a flash digest using the digest processor by cryptographically processing the sensitive information image;

comparing, using the digest processor, the flash digest with the certificate digest; and terminating a boot process of the digest processor responsive to the flash digest not matching the certificate digest, wherein the certificate processor is configured to perform more computationally-intensive operations than the digest processor, and wherein the certificate processor is configured to generate the certificate digest only at power-up to conserve power.

10. The method of claim 9, wherein the certificate is a cryptographically-signed certificate stored in a memory separate from the write-once, always-on memory, and the method further comprising:

verifying, using the certificate processor, a signature of the cryptographically-signed certificate;

extracting the certificate digest from the certificate; and storing the certificate digest in the write-once, always-on memory in response to verifying the signature of the cryptographically-signed certificate prior to the digest processor comparing the certificate digest to the flash digest.

11. The method of claim 10 wherein the verifying the signature comprises the certificate processor executing instructions stored in read-only memory.

12. The method of claim 10 further comprising the certificate processor locking the sensitive information image to inhibit modification of the sensitive information image.

13. The method of claim 10 wherein the digest processor is a lower-power-consuming processor than the certificate processor.

14. The method of claim 9 wherein the digest processor performs the calculating and the comparing in response to the digest processor powering up.

15. The method of claim 9 wherein the digest processor calculates the flash digest using information associated with a manufacturer of a product including the digest processor, or a product identification, or both the information associated with the manufacturer of the product and the product identification.

16. A secure boot system comprising:
means for authenticating a certificate;
means for extracting a certificate digest from the certificate at a certificate processor responsive to the secure boot system being powered up comprising a digest of a sensitive information image resulting from cryptographically processing the sensitive information image;
means for storing the certificate digest in a write-once, always-on memory, wherein the write-once, always-on memory is configured to be writable one time once powered up and to retain contents of the memory until the certificate processor is powered down and to clear the contents of the memory responsive to the certificate processor being powered down, wherein the certificate digest is stored in the write-once, always-on memory to ensure that the certificate digest cannot be modified once generated by the certificate processor;
means for obtaining the certificate digest from the write-once, always-on memory responsive to the secure boot system being powered up or a digest processor being rebooted;
calculating means for calculating a flash digest in the digest processor by cryptographically processing the sensitive information image, the digest processor being independently bootable from the certificate processor;
comparing means for comparing the flash digest with the certificate digest; and
means for terminating a boot process responsive to the flash digest not matching the certificate digest,
wherein the certificate processor is configured to perform more computationally-intensive operations than the digest processor, and wherein the means for authenticating the certificate is configured to authenticate the certificate and the means for extracting the certificate digest certificate digest is configured to extract the certificate digest only at power-up to conserve power.

17. The system of claim 16, wherein the certificate is a cryptographically-signed certificate stored in a memory separate from the write-once, always-on memory, the system further comprising:
means for verifying, using the certificate processor, a signature of the cryptographically-signed certificate;
means for extracting the certificate digest from the certificate; and
means for storing the certificate digest in the write-once, always-on memory in response to verifying the signature of the cryptographically-signed certificate prior to the means for comparing the certificate digest to the flash digest.

18. The system of claim 17 wherein the means for verifying the signature are configured to execute instructions stored in read-only memory to verify the signature.

19. The system of claim 17 wherein the means for verifying the signature are configured to lock the sensitive information image to inhibit modification of the sensitive information image.

20. The system of claim 17 wherein the digest processor comprises the means for calculating and the means for comparing, and the certificate processor comprises the means for verifying, wherein the digest processor is a lower-power-consuming, slower processor than the certificate processor.

21. The system of claim 16 wherein the digest processor comprises the means for calculating and the means for comparing, and wherein the means for calculating are configured to calculate the flash digest in response to the digest processor powering up.

22. The system of claim 16 wherein the means for calculating are for calculating the flash digest using information associated with a manufacturer of the system, or a product identification, or both the information associated with the manufacturer of the system and the product identification.

23. A non-transitory, processor-readable storage medium comprising processor-readable instructions configured to:

cause a certificate processor to generate a certificate digest responsive to a secure boot system being powered up by authenticating a certificate and extracting the certificate digest from the certificate, the certificate digest comprising a digest of a sensitive information image resulting from cryptographically processing the sensitive information image, wherein the instructions configured to cause the certificate processor to generate the certificate digest are configured to cause the certificate processor to generate the certificate digest only at power-up to conserve power;

cause the certificate processor to store the certificate digest in a write-once, always-on memory, wherein the write-once, always-on memory is configured to be writable one time once powered up, to retain contents of the memory until the certificate processor is powered down to clear the contents of the memory responsive to the certificate digest being powered down, wherein the certificate digest is stored in the write-once, always-on memory to ensure that the certificate digest cannot be modified once generated by the certificate processor;

cause a digest processor to obtain the certificate digest at from the write-once, always-on memory responsive to the secure boot system being powered up or the digest processor being rebooted, the digest processor being independently bootable from the certificate processor, wherein the certificate processor is configured to perform more computationally-intensive operations than the digest processor;

cause the digest processor to calculate a flash digest by cryptographically processing the sensitive information image; and cause the digest processor to compare the flash digest with the certificate digest;

cause the digest processor to terminate a boot process of the digest processor responsive to the flash digest not matching the certificate digest.

24. The storage medium of claim 23, wherein the certificate is a cryptographically-signed certificate stored in a memory separate from the write-once, always-on memory, the storage medium further comprising instructions configured to:

cause the certificate processor to verify a signature of the cryptographically-signed certificate; and cause the certificate processor to store the certificate digest in the write-once, always-on memory in response to verifying the signature of the cryptographically-signed certificate prior to the digest processor comparing the certificate digest to the flash digest.

25. The storage medium of claim 23 wherein the instructions configured to cause the digest processor to calculate the flash digest are configured to cause the digest processor to calculate the flash digest in response to the digest processor powering up.

26. The storage medium of claim 23 wherein the instructions configured to cause the digest processor to calculate the flash digest are configured to cause the digest processor to calculate the flash digest using information associated with a manufacturer of a product containing the digest processor, or a product identification, or both the information associated with the manufacturer of the product and the product identification.

* * * * *